United States Patent
Nagai

(10) Patent No.: US 12,510,559 B2
(45) Date of Patent: Dec. 30, 2025

(54) INERTIAL DETECTION CIRCUIT, INERTIAL SENSOR, AND INERTIAL DETECTION METHOD

(71) Applicant: Panasonic Intellectual Property Management Co., Ltd., Osaka (JP)

(72) Inventor: Masaaki Nagai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 376 days.

(21) Appl. No.: 18/000,353

(22) PCT Filed: Feb. 18, 2021

(86) PCT No.: PCT/JP2021/006031
§ 371 (c)(1),
(2) Date: Nov. 30, 2022

(87) PCT Pub. No.: WO2021/245993
PCT Pub. Date: Dec. 9, 2021

(65) Prior Publication Data
US 2023/0194564 A1  Jun. 22, 2023

(30) Foreign Application Priority Data
Jun. 4, 2020  (JP) ................................ 2020-097997

(51) Int. Cl.
*G01P 15/125*  (2006.01)
*G01P 21/00*  (2006.01)

(52) U.S. Cl.
CPC ............ *G01P 15/125* (2013.01); *G01P 21/00* (2013.01)

(58) Field of Classification Search
None
See application file for complete search history.

(56) References Cited

U.S. PATENT DOCUMENTS 6,768,349 B2 * 7/2004 Nakagawa ....... G01R 31/31917
714/740
2002/0134154 A1  9/2002 Hsu et al.
(Continued)

FOREIGN PATENT DOCUMENTS

DE  102012022512 A1 * 5/2014 ........... G01C 25/005
EP  2317328 A1  5/2011
(Continued)

OTHER PUBLICATIONS

Extended European Search Report dated Sep. 19, 2023 issued in the corresponding European Patent Application No. 21818421.6.
(Continued)

*Primary Examiner* — Douglas X Rodriguez
*Assistant Examiner* — Ruben C Parco, Jr.
(74) *Attorney, Agent, or Firm* — Rimon P.C.

(57) ABSTRACT

An inertial detection circuit includes a signal generator and a processing unit. The signal generator includes a drive voltage generator and a test voltage generator. The drive voltage generator applies to the fixed electrode a drive voltage with a first frequency. The test voltage generator applies to the fixed electrode a test voltage with a second frequency lower than the first frequency. The processing unit includes a detection processor and a diagnostic processor. The detection processor performs a detection processing of detecting a capacitance between the fixed electrode and the moving electrode based on a detection signal. The diagnostic processor performs a diagnostic processing of diagnosing abnormality of the detector based on a diagnostic signal.

10 Claims, 4 Drawing Sheets

(56) References Cited

U.S. PATENT DOCUMENTS

2017/0167876 A1    6/2017  Coronato et al.
2020/0300660 A1*  9/2020  Nakajima .............. G01C 23/00
2020/0408526 A1  12/2020  Matsudaira et al.
2024/0263945 A1*  8/2024  Li ......................... G01C 19/64

FOREIGN PATENT DOCUMENTS

| | | | |
|---|---|---|---|
| EP | 2605022 A1 | | 6/2013 |
| JP | 05281256 A | * | 10/1993 |
| JP | H05-281256 A | | 10/1993 |
| JP | 2015-017819 A | | 1/2015 |
| JP | 2019-505769 A | | 2/2019 |
| JP | 2019-174352 A | | 10/2019 |
| WO | 2017/098448 A1 | | 6/2017 |
| WO | 2019/187624 A1 | | 10/2019 |

OTHER PUBLICATIONS

International Search Report dated May 11, 2021 issued in International Patent Application No. PCT/JP2021/006031, with English translation.

* cited by examiner

INERTIAL DETECTION CIRCUIT, INERTIAL SENSOR, AND INERTIAL DETECTION METHOD

CROSS-REFERENCE OF RELATED APPLICATIONS

This application is the U.S. National Phase under 35 U.S.C. § 371 of International Patent Application No. PCT/JP2021/006031, filed on Feb. 18, 2021, which in turn claims the benefit of Japanese Patent Application No. 2020-097997, filed on Jun. 4, 2020, the entire disclosures of which Applications are incorporated by reference herein.

TECHNICAL FIELD

The present disclosure generally relates to inertial detection circuits, inertial sensors and inertial detection methods, and more particularly relates to an inertial detection circuit, which enables diagnosing abnormality, an inertial sensor including the inertial detection circuit, and an inertial detection method.

BACKGROUND ART

Patent Literature 1 discloses an acceleration sensor that includes a fixed electrode, a moving electrode and a detector. The moving electrode is movable in accordance with an acceleration given from the outside. The detector is configured to detect an acceleration in a prescribed direction based on a change in a capacitance between the moving electrode and the fixed electrode.

Regarding the acceleration sensor (inertial sensor) as disclosed in Patent Literature 1, it is considered that a configuration for diagnosing abnormality of the detector is added to the detector itself.

CITATION LIST

Patent Literature

Patent Literature 1: JP 2015-017819 A

SUMMARY OF INVENTION

It is therefore an object of the present disclosure to provide an inertial detection circuit, an inertial sensor and an inertial detection method, all of which can suppress that a configuration of a detector is complicated, while enabling abnormality diagnosis of the detector.

An inertial detection circuit according to an aspect of the present disclosure includes a signal generator and a processing unit. The signal generator is configured to generate a signal to be output to a detector. The detector is configured to convert an inertial force to an electrical signal. The processing unit is configured to process the electrical signal output from the detector. The detector includes a fixed electrode and a moving electrode. The moving electrode is disposed to face the fixed electrode. The moving electrode is movable with respect to the fixed electrode in a facing direction in which the moving electrode and the fixed electrode face each other. The signal generator includes a drive voltage generator and a test voltage generator. The drive voltage generator is configured to apply to the fixed electrode a drive voltage with a first frequency to make the moving electrode vibrate. The test voltage generator is configured to apply to the fixed electrode a test voltage with a second frequency lower than the first frequency to make the moving electrode vibrate. The processing unit includes a detection processor and a diagnostic processor. The detection processor is configured to perform a detection processing of detecting a capacitance between the fixed electrode and the moving electrode based on a detection signal. The detection signal corresponds to a component of an inertial force applied to the moving electrode, of the electrical signal output from the moving electrode. The diagnostic processor is configured to perform a diagnostic processing of diagnosing abnormality of the detector based on a diagnostic signal. The diagnostic signal corresponds to a component of the second frequency, of the electrical signal output from the moving electrode.

An inertial sensor according to an aspect of the present disclosure includes the inertial detection circuit and the detector.

An inertial detection method according to an aspect of the present disclosure includes a signal generating step and a processing step. The signal generating step includes generating a signal to be output to a detector. The detector is configured to convert an inertial force to an electrical signal. The processing step includes processing the electrical signal output from the detector. The detector includes a fixed electrode and a moving electrode. The moving electrode is disposed to face the fixed electrode. The moving electrode is movable with respect to the fixed electrode in a facing direction in which the moving electrode and the fixed electrode face each other. The signal generating step includes a drive voltage generating step and a test voltage generating step. The drive voltage generating step includes applying to the fixed electrode a drive voltage with a first frequency to make the moving electrode vibrate. The test voltage generating step includes applying to the fixed electrode a test voltage with a second frequency lower than the first frequency to make the moving electrode vibrate. The processing step includes a detection processing and a diagnostic processing. The detection processing includes detecting a capacitance between the fixed electrode and the moving electrode based on a detection signal. The detection signal corresponds to a component of an inertial force applied to the moving electrode, of the electrical signal output from the moving electrode. The diagnostic processing includes diagnosing abnormality of the detector based on a diagnostic signal. The diagnostic signal corresponds to a component of the second frequency, of the electrical signal output from the moving electrode.

DESCRIPTION OF EMBODIMENTS

Hereinafter, an inertial detection circuit, an inertial sensor and an inertial detection method according to each of embodiments of the present disclosure will be described with reference to the drawings. Each embodiment described below is merely one example of various embodiments of the present disclosure. Each embodiment described below may be readily modified in various manners depending on a design choice or any other factor, as long as the purpose of the present disclosure can be attained. Note that, each embodiment in the following description may be adopted in combination as appropriate.

First Embodiment

(1) Overview

Figure 1:
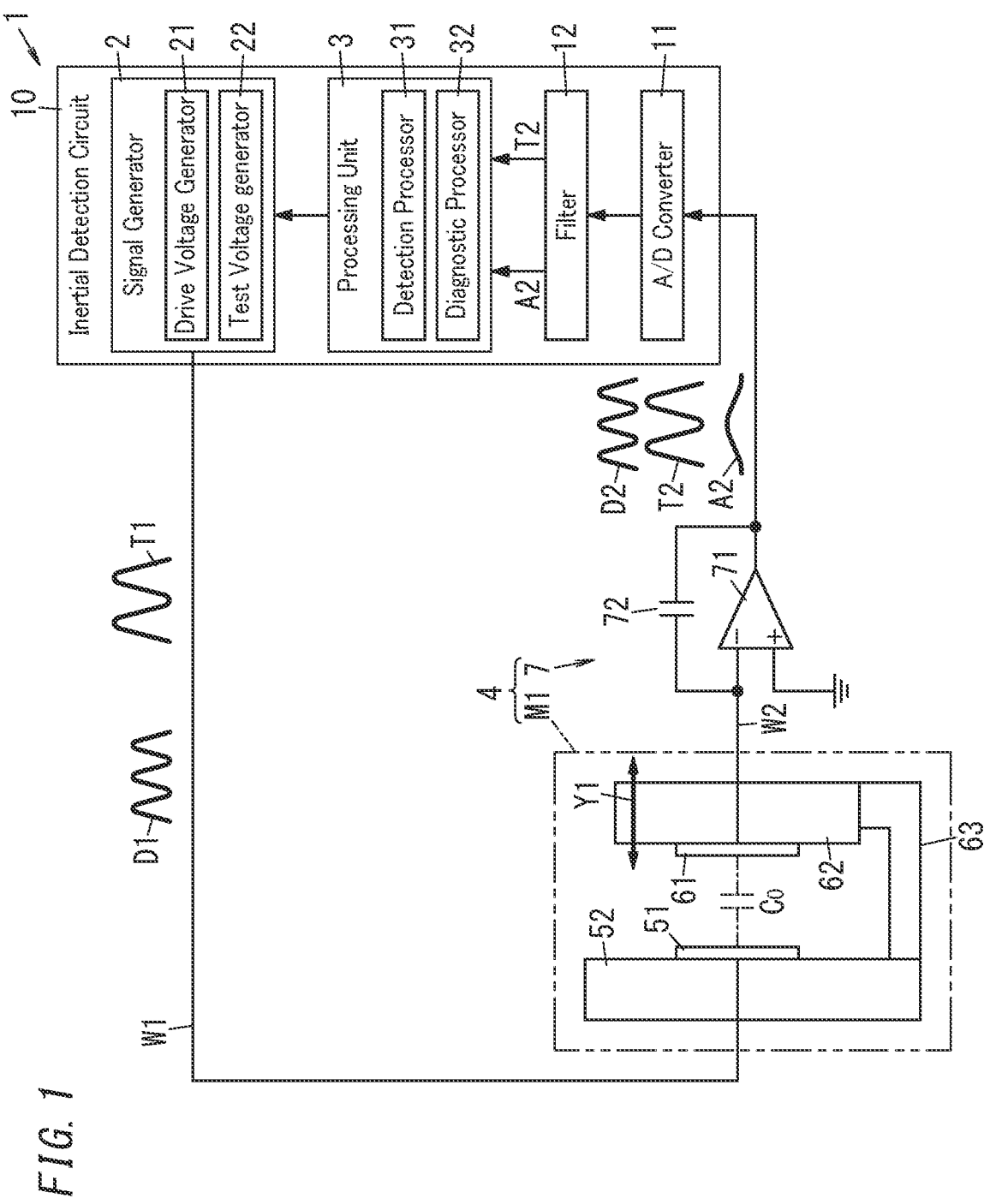
FIG. 1 is a block drawing of an inertial sensor according to a first embodiment.

As illustrated in FIG. 1, an inertial sensor 1 according to the present embodiment includes an inertial detection circuit 10 and a detector 4. The inertial sensor 1 is configured to detect an inertial force. A capacitance $C_0$ of the detector 4 is changed depending on a magnitude of an inertial force applied to the detector 4. Accordingly, the inertial sensor 1 can detect the magnitude of the inertial force applied to the detector 4 by detecting the capacitance $C_0$ of the detector 4.

Examples of the inertial force include an acceleration and an angular acceleration. The basic detection principle when the inertial force is the acceleration is the same as that when the inertial force is the angular acceleration. In the present embodiment, the case that the inertial sensor 1 detects the acceleration as the inertial force will be described as a representative example.

The inertial detection circuit 10 applies, to the detector 4, a drive voltage D1 (clock signal), which is an AC voltage, to detect the capacitance $C_0$ of the detector 4. Also, the inertial detection circuit 10 applies, to the detector 4, a test voltage T1, which is an AC voltage, to diagnose (presence or absence of) abnormality of the detector 4. In the present embodiment, the inertial detection circuit 10 applies, to the detector 4, a voltage where the drive voltage D1 and the test voltage T1 are superimposed with each other. Thus, the inertial detection circuit 10 also diagnoses the abnormality of the detector 4, while detecting the capacitance $C_0$ of the detector 4.

The inertial detection circuit 10 includes a signal generator 2 and a processing unit 3. The signal generator 2 is configured to generate a signal to be output to the detector 4. The detector 4 is configured to convert an inertial force to an electrical signal. The processing unit 3 is configured to process the electrical signal output from the detector 4. The detector 4 includes a fixed electrode 51 and a moving electrode 61. The moving electrode 61 is disposed to face the fixed electrode 51. The moving electrode 61 is movable with respect to the fixed electrode 51 in a facing direction in which the moving electrode 61 and the fixed electrode 51 face each other. The signal generator 2 includes a drive voltage generator 21 and a test voltage generator 22. The drive voltage generator 21 is configured to apply to the fixed electrode 51 the drive voltage D1 with a first frequency to make the moving electrode 61 vibrate. The test voltage generator 22 is configured to apply to the fixed electrode 51 the test voltage T1 with a second frequency lower than the first frequency to make the moving electrode 61 vibrate. The processing unit 3 includes a detection processor 31 and a diagnostic processor 32. The detection processor 31 is configured to perform a detection processing of detecting the capacitance $C_0$ between the fixed electrode 51 and the moving electrode 61 based on a detection signal A2. The detection signal A2 corresponds to a component of an inertial force applied to the moving electrode 61, of the electrical signal output from the moving electrode 61. The diagnostic processor 32 is configured to perform a diagnostic processing of diagnosing abnormality of the detector 4 based on a diagnostic signal T2. The diagnostic signal T2 corresponds to a component of the second frequency, of the electrical signal output from the moving electrode 61.

According to the present embodiment, the abnormality of the detector 4 can be diagnosed. Furthermore, the fixed electrode 51 serves not only as an electrode to which the drive voltage D1 is applied but also as an electrode to which the test voltage T1 is applied. Thus, the inertial detection circuit 10 can realize further simplifying the configuration of the detector 4, compared with that the detector 4 further includes an electrode to which the test voltage T1 is applied, separately from an electrode to which the drive voltage D1 is applied.

(2) Inertial Detection Circuit

The inertial detection circuit 10 includes, for example, a microcontroller (e.g., a digital signal processor: DSP) as a main component. The microcontroller may be implemented as a computer system including one or more processors and one or more memories. That is to say, as least some functions of the inertial detection circuit 10 are performed by making the one or more processors execute one or more programs stored in the one or more memories. The program may be stored in advance in the one or more memories, or may be downloaded via a telecommunications line such as the Internet or distributed after having been stored in a non-transitory storage medium such as a memory card.

The inertial detection circuit 10 further includes an A/D converter 11 and a filter 12 in addition to the signal generator 2 and the processing unit 3, but they are merely represented to explain some functions to be realized by the inertial detection circuit 10. Accordingly, they do not necessarily represent components with entities.

The test voltage T1 has an amplitude larger than an amplitude of the drive voltage D1. Also, the test voltage T1 has a frequency lower than a frequency of the drive voltage D1. The test voltage T1 and the drive voltage D1 output from the signal generator 2 are applied to the fixed electrode 51, thereby the moving electrode 61 being caused to vibrate with respect to the fixed electrode 51.

Furthermore, the acceleration is applied to the moving electrode 61, thereby the moving electrode 61 being caused to vibrate with respect to the fixed electrode 51. If the acceleration, which is a measurement target, is considered as vibration, the vibration has a sufficiently low frequency. The vibration frequency of the moving electrode 61, which is generated due to application of the acceleration (the measurement target) to the moving electrode 61, is lower than the frequency of the test voltage T1.

The moving electrode 61 outputs a current signal corresponding to the vibration. The current signal is converted to a voltage signal by a CV conversion circuit 7 of the detector 4, described later. That is to say, the detector 4 outputs the voltage signal corresponding to the vibration of the moving electrode 61. The voltage signal is a superimposed signal including: a component (the diagnostic signal T2) derived from the test voltage T1; and a component (a drive output D2) derived from the drive voltage D1.

A change in distance between the fixed electrode 51 and the moving electrode 61, due to the acceleration applied to the moving electrode 61, is output from the moving electrode 61, as an output that is in-phase with the drive voltage D1 (a clock signal). Therefore, the superimposed signal further includes a component (the detection signal A2) derived from the acceleration applied to the moving electrode 61.

The diagnostic signal T2 has a frequency lower than a frequency of the drive output D2. The detection signal A2 has a frequency lower than the frequency of the diagnostic signal T2. In the present embodiment, the detection signal A2 is assumed as a DC signal.

The diagnostic signal T2 has an amplitude larger than an amplitude of the drive output D2. The detection signal A2 has an absolute value smaller than the amplitude of the drive output D2.

The detector 4 outputs, to the inertial detection circuit 10, the superimposed signal, which includes the diagnostic signal T2, the drive output D2 and the detection signal A2. The A/D converter 11 converts the above-mentioned superimposed signal from an analog signal to a digital signal. The superimposed signal (as the digital signal) from the A/D converter 11 is input to the filter 12.

The filter 12 includes a low-pass filter and a band-pass filter. The filter 12 is configured as a digital filter. The above-mentioned superimposed signal (as the digital signal) from the A/D converter 11 is input to each of the low-pass filter and the band-pass filter. The low-pass filter of the filter 12 extracts the detection signal A2 from the superimposed signal (as the digital signal), output from the A/D converter 11. On the other hand, the band-pass filter of the filter 12 extracts the diagnostic signal T2 from the superimposed signal (as the digital signal), output from the A/D converter 11.

The detection processor 31 of the processing unit 3 is configured to perform a detection processing of detecting the capacitance $C_0$ between the fixed electrode 51 and the moving electrode 61 based on the detection signal A2. The diagnostic processor 32 is configured to perform a diagnostic processing of diagnosing abnormality of the detector 4 based on the diagnostic signal T2. Also, the diagnostic processor 32 is configured to perform a correction processing of correcting at least one of an output signal of the detector 4 or an output signal of the signal generator 2 based on the diagnostic signal T2. The detection processing, the diagnostic processing and the correction processing will be described in more detail later.

(3) Fixed Electrode and Moving Electrode

The detector 4 includes a detection module M1. The detection module M1 may be formed by the Micro Electro Mechanical Systems (MEMS) technology, for example. The detection module M1 includes the fixed electrode 51, the moving electrode 61, a fixed body 52, a mover 62 and a support 63.

The fixed body 52 and the mover 62 have electrical insulation. The fixed body 52 includes a semiconductor substrate, for example. The fixed body 52 is disposed to hold the fixed electrode 51. The mover 62 is disposed to hold the moving electrode 61. The support 63 is disposed to couple the fixed body 52 and the mover 62 to each other. The support 63 is provided to support the mover 62 such that the moving electrode 61 faces the fixed electrode 51 with the moving electrode 61 and the fixed electrode 51 being disposed at a prescribed interval. Thus, the moving electrode 61 is electrically insulated from the fixed electrode 51.

The support 63 is made of an elastic member. The moving electrode 61 and the mover 62 are movable together with elastic deformation of the support 63 to the fixed electrode 51 and the fixed body 52. The movement directions of the moving electrode 61 and the mover 62 are restricted to be along a facing direction in which the fixed electrode 51 and the moving electrode 61 face each other (refer to an arrow Y1).

A signal line W1 extending from the signal generator 2 is connected to the fixed electrode 51. Thus, the drive voltage D1 and the test voltage T1 are applied to the fixed electrode 51, of the fixed electrode 51 and the moving electrode 61. The potential of the moving electrode 61 is assumed as a reference potential of the drive voltage D1 and the test voltage T1.

When the drive voltage D1 and the test voltage T1 are applied to the fixed electrode 51, the moving electrode 61 vibrates, and accordingly a distance between the fixed electrode 51 and the moving electrode 61 is changed. Also, the distance between the fixed electrode 51 and the moving electrode 61 is changed in accordance with the acceleration applied to the moving electrode 61 (mover 62).

The capacitance $C_0$ is formed between the fixed electrode 51 and the moving electrode 61. The capacitance $C_0$ is changed to be inversely proportional to the distance between the fixed electrode 51 and the moving electrode 61. Thus, the capacitance $C_0$ is changed in accordance with the drive voltage D1, the test voltage T1, and the acceleration applied to the moving electrode 61.

(4) CV Conversion Circuit

The inertial sensor 1 further includes a CV conversion circuit 7. The CV conversion circuit 7 includes an operational amplifier 71 and a capacitor 72.

The operational amplifier 71 has a non-inverting input terminal at which a voltage is kept to the reference voltage. In the present embodiment, the non-inverting input terminal of the operational amplifier 71 is grounded.

The operational amplifier 71 further has an inverting input terminal, and a signal line W2 extending from the inverting input terminal is connected to the moving electrode 61. Thus, the inverting input terminal of the operational amplifier 71 is electrically connected to the moving electrode 61. The capacitor 72 has: a first end electrically connected to the inverting input terminal of the operational amplifier 71; and a second end electrically connected to an output terminal of the operational amplifier 71. The output terminal of the operational amplifier 71 is electrically connected to the inertial detection circuit 10.

The AC voltage to be applied between the fixed electrode 51 and the moving electrode 61 is represented by "$V=V_0 \times \exp(-j\omega t)$," where "$V_0$" denotes amplitude, "j" denotes imaginary unit, "$\omega$" denotes angular velocity and "t" denotes time. The AC current flowing from the moving electrode 61 to the capacitor 72 is represented by "$I=-j\omega C_0 V$." The output voltage of the operational amplifier 71 is represented by "$V_{out}=-j\omega C_0 ZV$," where "Z" denotes impedance of the capacitor 72. Thus, the operational amplifier 71 outputs a voltage with an amplitude that is proportional to the capacitance $C_0$ between the fixed electrode 51 and the moving electrode 61. That is to say, the CV conversion circuit 7 converts the capacitance $C_0$ to the voltage.

As described above, the capacitance $C_0$ is changed in accordance with the drive voltage D1, the test voltage T1, and the acceleration applied to the moving electrode 61. Therefore, the CV conversion circuit 7 (operational amplifier 71) outputs the voltage depending on the drive voltage D1, the test voltage T1, and the acceleration applied to the moving electrode 61. More specifically, the CV conversion circuit 7 (operational amplifier 71) outputs a superimposed signal where the diagnostic signal T2, the drive output D2 and the detection signal A2 are superimposed, which respectively have frequencies different from one another. The superimposed signal may be a voltage signal.

(5) Detection Processing

The filter 12 extracts the detection signal A2 from the above-mentioned superimposed signal. The detection processor 31 performs the detection processing of detecting, based on the detection signal A2, the capacitance $C_0$ between the fixed electrode 51 and the moving electrode 61. More specifically, the detection processor 31 obtains the capacitance $C_0$ by multiplying the absolute value of the detection signal A2 by a prescribed value (a first coefficient).

The detection processor 31 calculates the acceleration applied to the moving electrode 61, from the capacitance $C_0$ obtained based on the detection signal A2. More specifically, the detection processor 31 calculates the acceleration by multiplying the capacitance $C_0$ obtained based on the detection signal A2 by a prescribed value (a second coefficient). Alternatively, the detection processor 31 may calculate the acceleration directly from the detection signal A2. Since the acceleration is proportional to the capacitance $C_0$, calculating the acceleration can be also regarded as "obtaining the capacitance $C_0$."

(6) Diagnostic Processing and Correction Processing

(6-1) Overview of Processing

The filter 12 extracts the diagnostic signal T2 from the above-mentioned superimposed signal. The diagnostic processor 32 performs the diagnostic processing of diagnosing, based on the diagnostic signal T2, the abnormality of the detector 4.

For example, when the acceleration with a certain magnitude is added to the moving electrode 61, the displacement amount of the moving electrode 61 is preferably at a certain constant value. However, an abnormality that the structure of the detector 4 is mechanically changed may occur due to aging in the detector 4 or the like (e.g., an amount or a direction in the deflection of the support 63 may be changed). Thus, when the abnormality occurs at the detector 4, the displacement amount of the moving electrode 61 may deviate from the certain constant value. Such the "deviation" may cause an offset error and an amplitude error or the like in the voltage signal output from the detector 4, which may cause an error of the capacitance $C_0$ obtained based on the voltage signal.

In view of the above problem, the diagnostic processor 32 detects the offset error and the amplitude error or the like in the voltage signal to diagnose the abnormality of the detector 4 (i.e., the diagnostic processing). Furthermore, the diagnostic processor 32 corrects the offset error and the amplitude error or the like in the voltage signal (i.e., the correction processing).

If the abnormality occurs at the detector 4, the displacement amount of the moving electrode 61 becomes an abnormal amount when the test voltage T1 with a certain constant amplitude is applied to the fixed electrode 51. Accordingly, the diagnostic signal T2 shows an abnormal value. Therefore, the diagnostic processor 32 can diagnose the abnormality of the detector 4 based on the diagnostic signal T2.

(6-2) Correction for Magnitude of Input Signal

More specifically, the diagnostic processor 32 compares a difference between the amplitude of the diagnostic signal T2 and a prescribed value (hereinafter, referred to as an "amplitude design value") with a first threshold. The amplitude design value is set so as to correspond to the amplitude of the diagnostic signal T2 while the detector 4 operates normally. When finding that the difference between the amplitude of the diagnostic signal T2 and the amplitude design value is larger than or equal to the first threshold, the diagnostic processor 32 decides that an abnormality related to the amplitude of the voltage signal has occurred at the detector 4. Furthermore, the diagnostic processor 32 corrects, based on the diagnostic signal T2, a magnitude of at least one of the diagnostic signal T2 or the detection signal A2. More specifically, when finding that the difference between the amplitude of the diagnostic signal T2 and the amplitude design value is larger than or equal to the first threshold, the diagnostic processor 32 corrects, based on the difference between the amplitude of the diagnostic signal T2 and the amplitude design value, the magnitude of at least one of the diagnostic signal T2 or the detection signal A2. As the difference between the amplitude of the diagnostic signal T2 and the amplitude design value is increased, the diagnostic processor 32 increases a correction amount about the magnitude of at least one of the diagnostic signal T2 or the detection signal A2. Correcting the magnitude of the detection signal A2 can enhance the detection accuracy in the capacitance $C_0$ of the detector 4. Correcting the magnitude (amplitude) of the diagnostic signal T2 can cause the amplitude of the diagnostic signal T2 to be closer to the amplitude design value, which can suppress that the diagnostic processor 32 is kept in a state of continuously detecting the presence of the abnormality.

(6-3) Correction for Offset of Input Signal

Also, the diagnostic processor 32 compares an absolute value of the offset (the average of the maximum and the minimum) of the diagnostic signal T2 with a second threshold. The second threshold is set so as to correspond to the offset of the diagnostic signal T2 while the detector 4 operates normally. When finding that the absolute value of the offset of the diagnostic signal T2 is larger than or equal to the second threshold, the diagnostic processor 32 decides that an abnormality related to the offset of the voltage signal has occurred at the detector 4. Furthermore, the diagnostic processor 32 corrects, based on the diagnostic signal T2, the offset of at least one of the diagnostic signal T2 or the detection signal A2. More specifically, when finding that the absolute value of the offset of the diagnostic signal T2 is larger than or equal to the second threshold, the diagnostic processor 32 corrects, based on a difference between the offset of the diagnostic signal T2 and the second threshold, the offset of at least one of the diagnostic signal T2 or the detection signal A2. As the difference between the offset of the diagnostic signal T2 and the second threshold is increased, the diagnostic processor 32 increases a correction amount about the offset of at least one of the diagnostic signal T2 or the detection signal A2. The diagnostic processor 32 preferably decides the correction amount such that the offset of at least one of the diagnostic signal T2 or the detection signal A2 is caused to be zero. Correcting the offset of the detection signal A2 can enhance the detection accuracy in the capacitance $C_0$ of the detector 4. Correcting the offset of the diagnostic signal T2 can suppress that the diagnostic processor 32 is kept in a state of continuously detecting the presence of the abnormality.

(6-4) Correction for Amplitude of Output Signal

The signal generator 2 may correct, based on the diagnostic signal T2, the amplitude of at least one of the test voltage T1 or the drive voltage D1. More specifically, when finding that the difference between the amplitude of the diagnostic signal T2 and the amplitude design value is larger than or equal to the first threshold, the signal generator 2 may correct, based on the difference between the amplitude of the diagnostic signal T2 and the amplitude design value, the amplitude of at least one of the test voltage T1 or the drive voltage D1. As the difference between the amplitude of the diagnostic signal T2 and the amplitude design value is increased, the signal generator 2 may increase a correction amount about the amplitude of at least one of the test voltage T1 or the drive voltage D1. Correcting the amplitude of the drive voltage D1 can enhance the detection accuracy in the capacitance $C_0$ of the detector 4. Correcting the amplitude of test voltage T1 can cause the amplitude of the diagnostic signal T2 to be closer to the amplitude design value, which can suppress that the diagnostic processor 32 is kept in a state of continuously detecting the presence of the abnormality.

Both correcting the amplitude of the diagnostic signal T2 by the diagnostic processor 32 and correcting the amplitude of the test voltage T1 by the signal generator 2 (the test voltage generator 22) may be performed. Alternatively, only either correcting the amplitude of the diagnostic signal T2 or correcting the amplitude of the test voltage T1 may be performed. At least one of the amplitudes of the diagnostic signal T2 and the test voltage T1 is preferably corrected such that the difference between the amplitude of the diagnostic signal T2 and the amplitude design value is caused to be less than the first threshold.

Both correcting the magnitude of the detection signal A2 by the diagnostic processor 32 and correcting the magnitude (amplitude) of the drive voltage D1 by the signal generator 2 (the drive voltage generator 21) may be performed. Alternatively, only either correcting the magnitude of the detection signal A2 or correcting the magnitude of the drive voltage D1 may be performed. At least one of the magnitudes of the detection signal A2 and the drive voltage D1 is preferably corrected such that the magnitude of the detection signal A2 is caused to be a value within a prescribed range when a certain constant acceleration is applied to the moving electrode 61.

(6-5) Correction for Offset of Output Signal

The signal generator 2 may correct the offset of at least one of the test voltage T1 or the drive voltage D1, based on the diagnostic signal T2. More specifically, when finding that the absolute value of the offset of the diagnostic signal T2 is larger than or equal to the second threshold, the signal generator 2 may correct the offset of at least one of the test voltage T1 or the drive voltage D1, based on the difference between the offset of the diagnostic signal T2 and the second threshold. As the difference between the offset of the diagnostic signal T2 and the second threshold is increased, the signal generator 2 may increase a correction amount about the offset of at least one of the test voltage T1 or the drive voltage D1. The signal generator 2 preferably decides the correction amount such that the offset of at least one of the diagnostic signal T2 or the detection signal A2 is caused to be zero. Correcting the offset of the drive voltage D1 can enhance the detection accuracy in the capacitance $C_0$ of the detector 4. Correcting the offset of test voltage T1 can suppress that the diagnostic processor 32 is kept in a state of continuously detecting the presence of the abnormality.

Both correcting the offset of the diagnostic signal T2 by the diagnostic processor 32 and correcting the offset of the test voltage T1 by the signal generator 2 (the test voltage generator 22) may be performed. Alternatively, only either correcting the offset of the diagnostic signal T2 or correcting the offset of the test voltage T1 may be performed. At least one of the offsets of the diagnostic signal T2 and the test voltage T1 is preferably corrected such that the offset of the diagnostic signal T2 is caused to be a value within a prescribed range.

Both correcting the offset of the detection signal A2 by the diagnostic processor 32 and correcting the offset of the drive voltage D1 by the signal generator 2 (the drive voltage generator 21) may be performed. Alternatively, only either correcting the offset of the detection signal A2 or correcting the offset of the drive voltage D1 may be performed. At least one of the offsets of the detection signal A2 and the drive voltage D1 is preferably corrected such that the offset of the detection signal A2 is caused to be a value within a prescribed range.

The correction processing may be performed regardless of finding that the abnormality has occurred at the detector 4 based on the result obtained in the diagnostic processing by the diagnostic processor 32.

(7) Advantage

According to the inertial sensor 1 of the present embodiment, the abnormality of the detector 4 can be diagnosed. Furthermore, the fixed electrode 51 serves not only as an electrode to which the drive voltage D1 is applied but also as an electrode to which the test voltage T1 is applied. Thus, the inertial detection circuit 10 can realize further simplifying the configuration of the detector 4, compared with that the detector 4 further includes an electrode to which the test voltage T1 is applied, separately from an electrode to which the drive voltage D1 is applied. For example, the detector 4 can be downsized.

Also, a voltage to be applied to a circuit(s) (the CV conversion circuit 7 or the like) provided on the following stage of the moving electrode 61 is further reduced, compared with that the test voltage T1 is applied to the moving electrode 61. The reduction in the voltage therefore can loosen a requirement specification in the withstand voltage performance of the CV conversion circuit 7 or the like.

Furthermore, the test voltage T1 is applied to the fixed electrode 51, but no test voltage T1 is applied to the moving electrode 61 displacing depending on the inertial force. Therefore, it can further reduce the chance that the test voltage T1 affects detecting the detection signal A2, compared with that the test voltage T1 is applied to the moving electrode 61. Accordingly, it can reduce the chance that the detection accuracy in the capacitance $C_0$ (i.e., the inertial force applied to the detector 4) between the fixed electrode 51 and the moving electrode 61 is deteriorated.

Variation of First Embodiment

Hereinafter, variations of the first embodiment will be listed. The following variations may be adopted in combination as appropriate.

The support 63 may support the moving electrode 61 without via the mover 62. The support 63 may be connected to the fixed electrode 51 without via the fixed body 52.

In the first embodiment, the detection signal A2 is assumed as the DC signal, and the processing unit 3 corrects the magnitude of the detection signal A2 in the correction processing. On the other hand, when the detection signal A2 is assumed as an AC signal, the magnitude of the detection signal A2 may be the amplitude of the detection signal A2.

Instead of the capacitor 72, the CV conversion circuit 7 may include: a resistor; a parallel circuit where a resistor and a capacitor 72 are connected in parallel; or a parallel circuit where a capacitor 72 and a switch for discharging the electric charge of the capacitor 72 are connected in parallel, for example.

The signal lines W1, W2 may include patterned conductors formed in the printed board. Also, the signal lines W1, W2 may include cables such as copper wires.

The detector 4 is configured such that the distance between the moving electrode 61 and the fixed electrode 51 is changed in accordance with the acceleration, but this configuration is merely an example and should not be construed as limiting. Another configuration may be adopted, as long as the detector 4 is configured such that the capacitance $C_O$ between the moving electrode 61 and the fixed electrode 51 is changed in accordance with the acceleration. For example, the detector 4 may be configured such that facing areas of the moving electrode 61 and the fixed electrode 51 facing each other are changed in accordance with the acceleration.

The inertial detection circuit 10 may be configured to notify the user of the diagnostic result about the abnormality of the detector 4, obtained from the diagnostic processor 32, by outputting a text message or a voice message and so on. The drive voltage generator 21 may be configured to stop outputting the drive voltage D1 when the diagnostic processor 32 has detected presence of the abnormality at the detector 4.

The inertial detection circuit 10 may include an amplifier configured to amplify the output of the detector 4 and disposed on the front stage of the A/D converter 11.

The functions of the inertial detection circuit 10 and the inertial sensor 1 may also be implemented as an inertial detection method, a (computer) program or a non-transitory storage medium on which the computer program is stored.

An inertial detection method according to one aspect includes a signal generating step and a processing step. The signal generating step includes generating a signal to be output to a detector 4. The detector 4 is configured to convert an inertial force to an electrical signal. The processing step includes processing the electrical signal output from the detector 4. The detector 4 includes a fixed electrode 51 and a moving electrode 61. The moving electrode 61 is disposed to face the fixed electrode 51. The moving electrode 61 is movable with respect to the fixed electrode 51 in a facing direction in which the moving electrode 61 and the fixed electrode 51 face each other.

Figure 2:
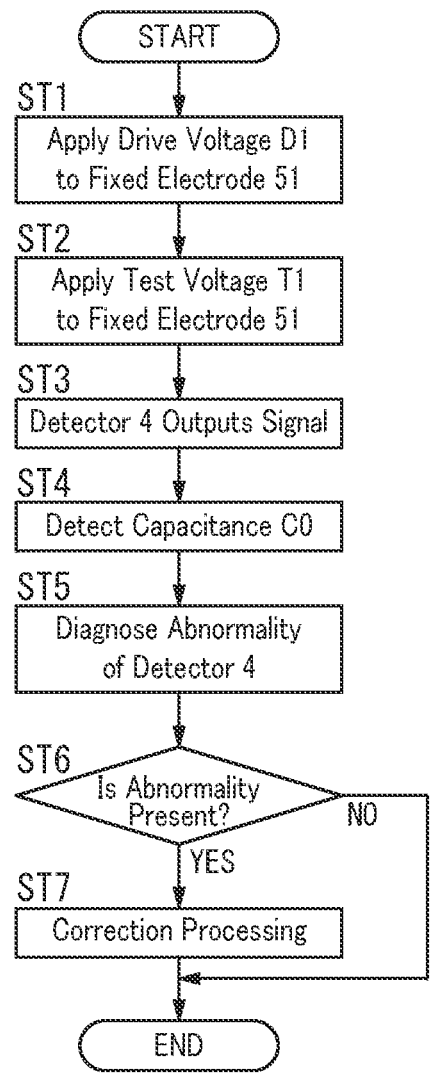
FIG. 2 is a flowchart showing an operational example of the inertial sensor.

As illustrated in FIG. 2, the signal generating step includes a drive voltage generating step ST1 and a test voltage generating step ST2. The drive voltage generating step ST1 includes applying to the fixed electrode 51 a drive voltage D1 with a first frequency to make the moving electrode 61 vibrate. The test voltage generating step ST2 includes applying to the fixed electrode 51 a test voltage T1 with a second frequency lower than the first frequency to make the moving electrode 61 vibrate. More specifically, the signal generator 2 applies the superimposed voltage, where the drive voltage D1 and the test voltage T1 are superimposed, to the fixed electrode 51.

When the drive voltage generating step ST1 and the test voltage generating step ST2 are performed and the inertial force (acceleration) is added to the moving electrode 61, the detector 4 outputs to the inertial detection circuit 10 the superimposed signal, where the diagnostic signal T2, the drive output D2 and the detection signal A2 are superimposed (in Step ST3).

The processing step includes a detection processing ST4 and a diagnostic processing ST5. The detection processing ST4 includes detecting a capacitance $C_O$ between the fixed electrode 51 and the moving electrode 61 based on a detection signal A2. The detection signal A2 corresponds to a component of an inertial force applied to the moving electrode 61, of the electrical signal output from the moving electrode 61. The diagnostic processing ST5 includes diagnosing abnormality of the detector 4 based on a diagnostic signal T2. The diagnostic signal T2 corresponds to a component of the second frequency, of the electrical signal output from the moving electrode 61. If finding that the abnormality is present at the detector 4 based on the result obtained in the diagnostic processing ST5 (if the answer is Yes in Step S6), the processing unit 3 performs the correction processing to correct the offset error and the amplitude error or the like in the voltage signal output from the detector 4 (in Step ST7). While the inertial sensor 1 operates, the processes from the drive voltage generating step ST1 to the Step ST7 are repeatedly performed.

The flowchart shown in FIG. 2 is merely an example of the inertial detection method according to the present variation. The order of the processes in the flowchart may be modified as appropriate. Also, one or more processes may be newly added, or any of the processes in the flowchart may be omitted.

A program according to one aspect may be designed to cause one or more processors to execute the inertial detection method described above.

The inertial detection circuit 10 according to the present disclosure includes a computer system. The computer system includes a processor and a memory as hardware components. The functions of the inertial detection circuit 10 according to the present disclosure may be realized by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large scale integrated circuit (VLSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, the plurality of functions of the inertial detection circuit 10 are integrated together in a single housing, but this is not an essential configuration for the inertial detection circuit 10. Alternatively, the plurality of functions of the inertial detection circuit 10 may be distributed in multiple different housings. Still alternatively, at least some functions of the inertial detection circuit 10 (e.g., some functions of the processing unit 3) may be implemented as a cloud computing system as well.

In contrast, at least some functions of the inertial sensor 1 distributed in multiple different housings in an embodiment may be integrated together in a single housing. For example, some functions of the inertial sensor 1 distributed in the inertial detection circuit 10 and the detector 4 may be integrated together in a single housing.

Second Embodiment

Figure 3:
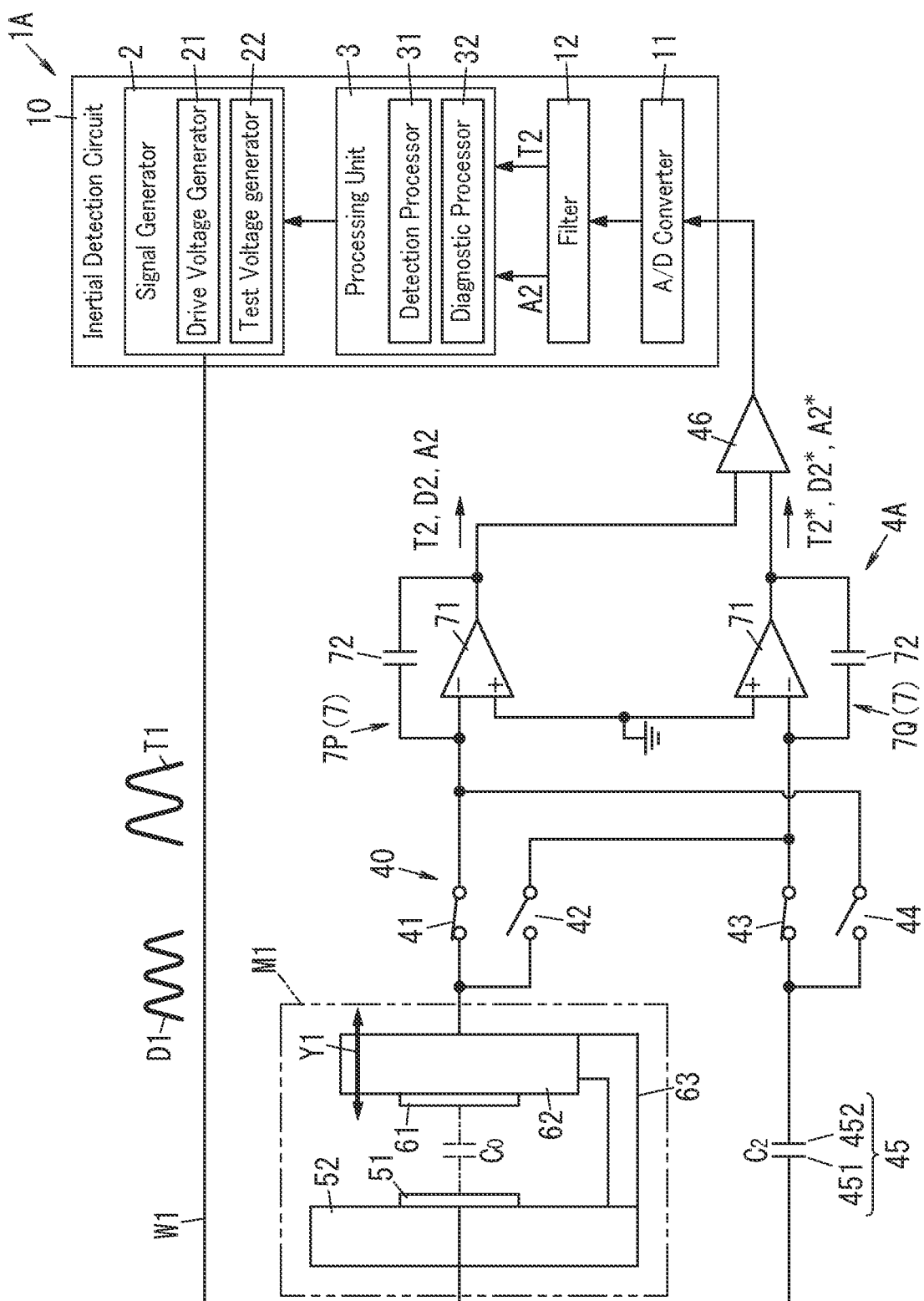
FIG. 3 is a block drawing of an inertial sensor according to a second embodiment.

Hereinafter, an inertial sensor 1A according to a second embodiment will be described with reference to FIG. 3. Components similar to those of the first embodiment are assigned with the same reference numbers and the explanations thereof are omitted.

The inertial sensor 1A of the present embodiment is different from the inertial sensor 1 of the first embodiment in the configuration of a detector 4A. The detector 4A is configured to output, to a processing unit 3, a differential signal between an output signal of a moving electrode 61 and an output signal of a fixed electrode 51.

The detector 4A includes a detection module M1, a switching unit 40, a capacitor 45, two CV conversion circuits 7 and a differential amplifier 46.

The capacitor 45 includes a first electrode 451 and a second electrode 452. The first electrode 451 is electrically connected to the fixed electrode 51. The second electrode 452 is disposed to face the first electrode 451. The second electrode 452 is electrically connected to the switching unit 40. A capacitance $C_2$ between the first electrode 451 and the second electrode 452 may be a value corresponding to a capacitance $C_0$ between the fixed electrode 51 and the moving electrode 61. More specifically, the capacitor 45 is selected such that a difference between the capacitance $C_2$ and the capacitance $C_0$ is less than a prescribed value while the moving electrode 61 does not vibrate.

The configuration of each of the two CV conversion circuits 7 is substantially the same as that of the CV conversion circuit 7 of the first embodiment. Hereinafter, the two CV conversion circuits 7 may be also respectively referred to as a first CV conversion circuit 7P and a second CV conversion circuit 7Q to distinguish those from each other for convenience of explanation. Output terminals of the two CV conversion circuits 7 are electrically connected to input terminals of the differential amplifier 46, respectively.

The differential amplifier 46 is configured to output, to the inertial detection circuit 10, a differential voltage between an output voltage of the first CV conversion circuit 7P and an output voltage of the second CV conversion circuit 7Q. The output voltage of the first CV conversion circuit 7P in FIG. 3 is a voltage depending on an output current from the moving electrode 61. That is to say, the output voltage of the first CV conversion circuit 7P is a superimposed signal where a diagnostic signal T2, a drive output D2 and a detection signal A2 are superimposed. On the other hand, the output voltage of the second CV conversion circuit 7Q in FIG. 3 is a voltage depending on a current output from the fixed electrode 51 via the capacitor 45. That is to say, the output voltage of the second CV conversion circuit 7Q is a reference signal to be compared with the output voltage of the first CV conversion circuit 7P and is also a superimposed signal where a diagnostic signal T2*, a drive output D2* and a detection signal A2* are superimposed.

The processing unit 3 performs a detection processing, a diagnostic processing and a correction processing based on the differential voltage output from the differential amplifier 46. More specifically, a differential voltage between the detection signals A2, A2* and a differential voltage between the diagnostic signals T2, T2* are extracted by the filter 12. The detection processor 31 performs the detection processing to detect the capacitance $C_0$ between the fixed electrode 51 and the moving electrode 61 based on the differential voltage between the detection signals A2, A2*. The diagnostic processor 32 performs the diagnostic processing to diagnose the abnormality of the detector 4A based on the differential voltage between the diagnostic signals T2, T2*. The diagnostic processor 32 corrects magnitudes and offsets of the diagnostic signals T2, T2* and the detection signals A2, A2* based on the differential voltage between the diagnostic signals T2, T2*. Parameters (thresholds or the like) according to the detection processing, the diagnostic processing and the correction processing may be modified as appropriate from those of the first embodiment.

The switching unit 40 includes switches 41 to 44. The switches 41 to 44 may be semiconductor switches.

The switch 41 is connected between the moving electrode 61 and an inverting input terminal of an operational amplifier 71 of the first CV conversion circuit 7P. The switch 42 is connected between the moving electrode 61 and an inverting input terminal of an operational amplifier 71 of the second CV conversion circuit 7Q.

The switch 43 is connected between the second electrode 452 and the inverting input terminal of the operational amplifier 71 of the second CV conversion circuit 7Q. The switch 44 is connected between the second electrode 452 and the inverting input terminal of the operational amplifier 71 of the first CV conversion circuit 7P.

That is to say, an input terminal (inverting input terminal) of each of the first and second CV conversion circuits 7P, 7Q is electrically connected to the fixed electrode 51 or the moving electrode 61 via the switching unit 40. An output terminal of each of the first and second CV conversion circuits 7P, 7Q outputs a voltage depending on the capacitance $C_0$ between the fixed electrode 51 and the moving electrode 61.

The differential amplifier 46 outputs, to the processing unit 3, the differential voltage between the voltage output from the output terminal of the first CV conversion circuit 7P and the voltage output from the output terminal of the second CV conversion circuit 7Q.

The switching unit 40 is configured to switch between a first state and a second state. The first state is a state where the switches 41, 43 are turned OFF and the switches 42, 44 are turned ON. That is to say, the first state is a state where the second electrode 452 is caused to be electrically connected to the input terminal of the first CV conversion circuit 7P, and the moving electrode 61 is caused to be electrically connected to the input terminal of the second CV conversion circuit 7Q. The second state is a state where switches 41, 43 are turned ON and the switches 42, 44 are turned OFF. That is to say, the second state is a state where the second electrode 452 is caused to be electrically connected to the input terminal of the second CV conversion circuit 7Q, and the moving electrode 61 is caused to be electrically connected to the input terminal of the first CV conversion circuit 7P.

The switching unit 40 alternately switches between the first state and the second state in accordance with a control signal output from the inertial detection circuit 10. Thus, signal chopping is performed in the detector 4A, which therefore can reduce the error in the offset of signal output from the moving electrode 61.

Third Embodiment

Figure 4:
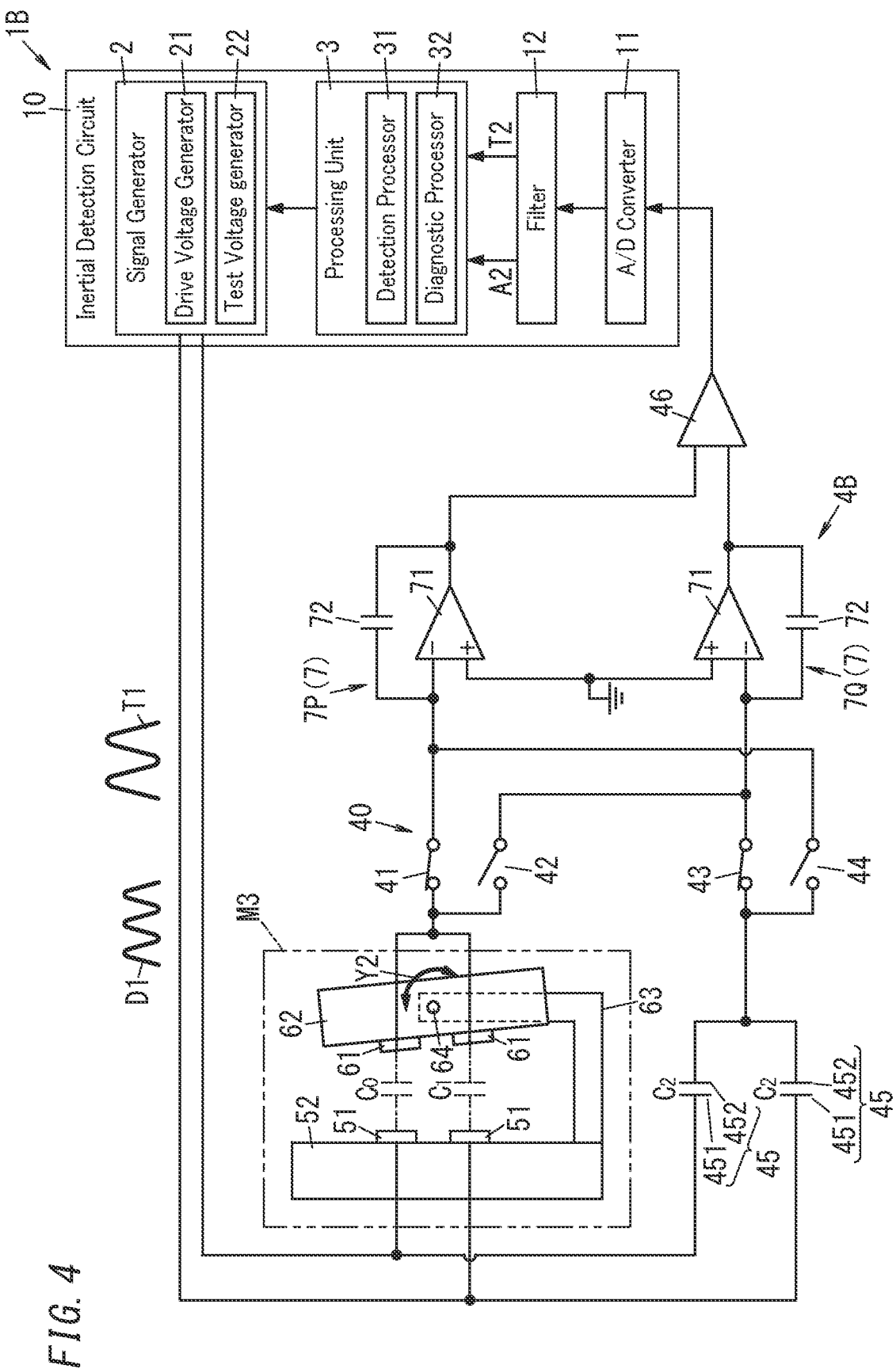
FIG. 4 is a block drawing of an inertial sensor according to a third embodiment.

Hereinafter, an inertial sensor 1B according to a third embodiment will be described with reference to FIG. 4. Components similar to those of the second embodiment are assigned with the same reference numbers and the explanations thereof are omitted.

The inertial sensor 1B of the present embodiment includes a detection module M3 having the configuration different from that of the detection module M1 of the second embodiment. Also, a detector 4B includes two capacitors 45.

The detection module M3 includes two fixed electrodes 51, a fixed body 52, two moving electrodes 61, a mover 62, a support 63 and a rotational shaft 64.

The two fixed electrodes 51 correspond to the two moving electrodes 61 one-to-one. Each moving electrode 61 is disposed to face a corresponding fixed electrode 51. One of the two moving electrodes 61 and a corresponding fixed electrode 51 form a capacitance $C_0$ therebetween. The other of the two moving electrodes 61 and a corresponding fixed electrode 51 form a capacitance $C_1$ therebetween.

The two fixed electrodes 51 are held by the fixed body 52. The two moving electrodes 61 are held by the mover 62. The support 63 may be a rigid body. The mover 62 is turnable around the rotational shaft 64 with respect to the support 63 (refer to an arrow Y2). The mover 62 is turned by the acceleration being applied to the mover 62, and accordingly, a distance between each moving electrode 61 and a corresponding fixed electrode 51 is changed, and the capacitances $C_0$ and $C_1$ between the moving electrodes 61 and the fixed electrodes 51 are also changed. When one of the two moving electrodes 61 comes closer to a corresponding fixed electrode 51, the other of them is apart from a corresponding fixed electrode 51. Therefore, when the capacitance $C_0$ (or $C_1$) corresponding to one of the two moving electrodes 61 is increased, the capacitance $C_1$ (or $C_0$) corresponding to the other of them is reduced.

A drive voltage D1 and a test voltage T1 are applied to each of the two fixed electrodes 51. The voltages to be input to one of the two fixed electrodes 51 corresponds to reversal voltages of the voltages to be input to the other of them. Each of the two moving electrodes 61 is connected to the switches 41, 42.

The drive voltage D1 and the test voltage T1 are applied to each of the two capacitors 45. The voltages to be applied to the two capacitors 45 are in a reverse-phase relation to each other. The capacitances $C_2$ of the two capacitors 45 are equal to each other. Each capacitor 45 is selected such that a difference between each of the capacitances $C_0$, $C_1$ and the capacitance $C_2$ is less than a prescribed value while the moving electrode 61 does not vibrate.

In accordance with the state of the switching unit 40, the current corresponding to the capacitances $C_0$, $C_1$ is input to one of the first and second CV conversion circuits 7P, 7Q, and the current corresponding to the capacitances $C_2$, $C_2$ of the two capacitors 45 is input to the other of the first and second CV conversion circuits 7P, 7Q.

Thus, a rotary-type of mover 62 (moving electrode 61) is used in the present embodiment. Therefore, each CV conversion circuit 7 outputs the voltage corresponding to the difference between the capacitances $C_0$, $C_1$ of the two moving electrodes 61, which accordingly can reduce the detection error in the acceleration applied to the mover 62.

Similarly to the second embodiment, the differential amplifier 46 outputs a differential voltage between an output voltage of the first CV conversion circuit 7P and an output voltage of the second CV conversion circuit 7Q, and the processing unit 3 performs the detection processing, the diagnostic processing and the correction processing based on the differential voltage output from the differential amplifier 46. Parameters (thresholds or the like) according to the detection processing, the diagnostic processing and the correction processing may be modified as appropriate from those of the second embodiment.

In the detection processing, the detection processor 31 detects the capacitance corresponding to at least one of the capacitances $C_0$, $C_1$. That is to say, when a plurality of sets (each of which includes a fixed electrode 51 and a moving electrode 61) are provided as the present embodiment, the detection processing means a processing of detecting the capacitance corresponding to at least one of the plurality of sets. Also, the detection processor 31 obtains the acceleration added to at least one moving electrode 61 based on the capacitance detected.

(Recapitulation)

As can be seen from the foregoing embodiments and the like, the following aspects are disclosed.

An inertial detection circuit (10) according to a first aspect includes a signal generator (2) and a processing unit (3). The signal generator (2) is configured to generate a signal to be output to a detector (4, 4A, 4B). The detector (4, 4A, 4B) is configured to convert an inertial force to an electrical signal. The processing unit (3) is configured to process the electrical signal output from the detector (4, 4A, 4B). The detector (4, 4A, 4B) includes a fixed electrode (51) and a moving electrode (61). The moving electrode (61) is disposed to face the fixed electrode (51). The moving electrode (61) is movable with respect to the fixed electrode (51) in a facing direction in which the moving electrode (61) and the fixed electrode (51) face each other. The signal generator (2) includes a drive voltage generator (21) and a test voltage generator (22). The drive voltage generator (21) is configured to apply to the fixed electrode (51) a drive voltage (D1) with a first frequency to make the moving electrode (61) vibrate. The test voltage generator (22) is configured to apply to the fixed electrode (51) a test voltage (T1) with a second frequency lower than the first frequency to make the moving electrode (61) vibrate. The processing unit (3) includes a detection processor (31) and a diagnostic processor (32). The detection processor (31) is configured to perform a detection processing of detecting a capacitance ($C_0$) between the fixed electrode (51) and the moving electrode (61) based on a detection signal (A2). The detection signal (A2) corresponds to a component of an inertial force applied to the moving electrode (61), of the electrical signal output from the moving electrode (61). The diagnostic processor (32) is configured to perform a diagnostic processing of diagnosing abnormality of the detector (4, 4A, 4B) based on a diagnostic signal (T2). The diagnostic signal (T2) corresponds to a component of the second frequency, of the electrical signal output from the moving electrode (61).

According to the above configuration, the abnormality of the detector (4, 4A, 4B) can be diagnosed. Furthermore, the fixed electrode (51) serves not only as an electrode to which the drive voltage (D1) is applied but also as an electrode to which the test voltage (T1) is applied. Thus, the inertial detection circuit (10) can realize further simplifying the configuration of the detector (4, 4A, 4B), compared with that the detector (4, 4A, 4B) further includes an electrode to which the test voltage (T1) is applied, separately from an electrode to which the drive voltage (D1) is applied.

In an inertial detection circuit (10) according to a second aspect, which may be implemented in conjunction with the first aspect, the processing unit (3) is configured to correct, based on the diagnostic signal (T2), an offset of at least one of the diagnostic signal (T2) or the detection signal (A2).

According to the above configuration, the inertial detection circuit (10) can improve the accuracy of detection about the inertial force.

In an inertial detection circuit (10) according to a third aspect, which may be implemented in conjunction with the first or second aspect, the signal generator (2) is configured to correct, based on the diagnostic signal (T2), an offset of at least one of the test voltage (T1) or the drive voltage (D1).

According to the above configuration, the inertial detection circuit (10) can improve the accuracy of detection about the inertial force.

In an inertial detection circuit (10) according to a fourth aspect, which may be implemented in conjunction with any one of the first to third aspects, the processing unit (3) is configured to correct, based on the diagnostic signal (T2), a magnitude of at least one of the diagnostic signal (T2) or the detection signal (A2).

According to the above configuration, the inertial detection circuit (10) can improve the accuracy of detection about the inertial force.

In an inertial detection circuit (10) according to a fifth aspect, which may be implemented in conjunction with any one of the first to fourth aspects, the signal generator (2) is configured to correct, based on the diagnostic signal (T2), an amplitude of at least one of the test voltage (T1) or the drive voltage (D1).

According to the above configuration, the inertial detection circuit (10) can improve the accuracy of detection about the inertial force.

Note that the constituent elements other than the constituent elements according to the first aspect are not essential constituent elements for the inertial detection circuit (10) but may be omitted as appropriate.

An inertial sensor (1, 1A, 1B) according to a sixth aspect includes the inertial detection circuit (10) according to any one of the first to fifth aspects and the detector (4, 4A, 4B).

According to the above configuration, the inertial sensor (1, 1A, 1B) can realize further simplifying the configuration of the detector (4, 4A, 4B), compared with that the detector (4, 4A, 4B) further includes an electrode to which the test voltage (T1) is applied, separately from an electrode to which the drive voltage (D1) is applied.

In an inertial sensor (1A, 1B) according to a seventh aspect, which may be implemented in conjunction with the sixth aspect, the detector (4A, 4B) is configured to output, to the processing unit (3), a differential signal between an output signal of the moving electrode (61) and an output signal of the fixed electrode (51).

According to the above configuration, the inertial sensor (1A, 1B) can reduce the noise and the offset error in the detection signal (A2).

In an inertial sensor (1A, 1B) according to an eighth aspect, which may be implemented in conjunction with the seventh aspect, the detector (4A, 4B) includes a first CV conversion circuit (7P) and a second CV conversion circuit (7Q), a differential amplifier (46), a capacitor (45) and a switching unit (40). Each of the first CV conversion circuit (7P) and the second CV conversion circuit (7Q) includes an input terminal to be electrically connected to the fixed electrode (51) or the moving electrode (61), and an output terminal outputting a voltage depending on the capacitance ($C_0$) between the fixed electrode (51) and the moving electrode (61). The differential amplifier (46) is configured to output, to the processing unit (3), a differential voltage between a voltage output from the output terminal of the first CV conversion circuit (7P) and a voltage output from the output terminal of the second CV conversion circuit (7Q). The capacitor (45) includes a first electrode (451) and a second electrode (452). The first electrode (451) is electrically connected to the fixed electrode (51). The second electrode (452) is disposed to face the first electrode (451). The switching unit (40) is configured to switch between a first state and a second state. The first state is a state where the second electrode (452) is caused to be electrically connected to the input terminal of the first CV conversion circuit (7P), and the moving electrode (61) is caused to be electrically connected to the input terminal of the second CV conversion circuit (7Q). The second state is a state where the second electrode (452) is caused to be electrically connected to the input terminal of the second CV conversion circuit (7Q), and the moving electrode (61) is caused to be electrically connected to the input terminal of the first CV conversion circuit (7P).

According to the above configuration, the inertial sensor (1A, 1B) can reduce the noise and the offset error in the detection signal (A2).

Note that the constituent elements other than the constituent elements according to the sixth aspect are not essential constituent elements for the inertial sensor (1, 1A, 1B) but may be omitted as appropriate.

An inertial detection method according to a ninth aspect includes a signal generating step and a processing step. The signal generating step includes generating a signal to be output to a detector (4, 4A, 4B). The detector (4, 4A, 4B) is configured to convert an inertial force to an electrical signal. The processing step includes processing the electrical signal output from the detector (4, 4A, 4B). The detector (4, 4A, 4B) includes a fixed electrode (51) and a moving electrode (61). The moving electrode (61) is disposed to face the fixed electrode (51). The moving electrode (61) is movable with respect to the fixed electrode (51) in a facing direction in which the moving electrode (61) and the fixed electrode (51) face each other. The signal generating step includes a drive voltage generating step (ST1) and a test voltage generating step (ST2). The drive voltage generating step (ST1) includes applying to the fixed electrode (51) a drive voltage (D1) with a first frequency to make the moving electrode (61) vibrate. The test voltage generating step (ST2) includes applying to the fixed electrode (51) a test voltage (T1) with a second frequency lower than the first frequency to make the moving electrode (61) vibrate. The processing step includes a detection processing (ST4) and a diagnostic processing (ST5). The detection processing (ST4) includes detecting a capacitance ($C_0$) between the fixed electrode (51) and the moving electrode (61) based on a detection signal (A2). The detection signal (A2) corresponds to a component of an inertial force applied to the moving electrode (61), of the electrical signal output from the moving electrode (61). The diagnostic processing (ST5) includes diagnosing abnormality of the detector (4, 4A, 4B) based on a diagnostic signal (T2). The diagnostic signal (T2) corresponds to a component of the second frequency, of the electrical signal output from the moving electrode (61).

According to the above configuration, the inertial detection method can realize further simplifying the configuration of the detector (4, 4A, 4B), compared with that the detector (4, 4A, 4B) further includes an electrode to which the test voltage (T1) is applied, separately from an electrode to which the drive voltage (D1) is applied.

Various configurations of the inertial sensor (1, 1A, 1B) according to the embodiments (including the variations) are not limited to the above aspects but may be embodied by the inertial detection method.

REFERENCE SIGNS LIST 1, 1A, 1B Inertial Sensor
2 Signal Generator
3 Processing Unit
4, 4A, 4B Detector
7P First CV Conversion Circuit
7Q Second CV Conversion Circuit
10 Inertial Detection Circuit
21 Drive Voltage Generator
22 Test Voltage Generator
31 Detection Processor
32 Diagnostic Processor
40 Switching Unit
45 Capacitor
46 Differential Amplifier
51 Fixed Electrode
61 Moving Electrode
451 First Electrode
452 Second Electrode
A2 Detection Signal
$C_0$ Capacitance
D1 Drive Voltage
ST1 Drive Voltage Generating Step
ST2 Test Voltage Generating Step
ST4 Detection Processing
ST5 Diagnostic Processing
T1 Test Voltage
T2 Diagnostic Signal

The invention claimed is:
1. An inertial detection circuit, comprising:
a signal generator configured to generate a signal to be output to a detector configured to convert an inertial force to an electrical signal; and
a processing unit configured to process the electrical signal output from the detector,
the detector including:
a fixed electrode; and
a moving electrode disposed to face the fixed electrode, the moving electrode being movable with respect to the fixed electrode in a facing direction in which the moving electrode and the fixed electrode face each other, wherein the signal generator includes:
a drive voltage generator configured to apply to the fixed electrode a drive voltage with a first frequency to make the moving electrode vibrate; and
a test voltage generator configured to apply to the fixed electrode a test voltage with a second frequency lower than the first frequency to make the moving electrode vibrate, the processing unit includes:
a detection processor configured to perform a detection processing of detecting a capacitance value between the fixed electrode and the moving electrode based on a detection signal, corresponding to a component of an inertial force applied to the moving electrode, of the electrical signal output from the moving electrode; and
a diagnostic processor configured to perform a diagnostic processing of diagnosing abnormality of the detector based on a diagnostic signal, corresponding to a component of the second frequency, of the electrical signal output from the moving electrode, and
the signal generator is configured to correct, based on the diagnostic signal, an offset of at least one of the test voltage or the drive voltage.

2. The inertial detection circuit of claim 1, wherein the processing unit is configured to correct, based on the diagnostic signal, an offset of at least one of the diagnostic signal or the detection signal.

3. The inertial detection circuit of claim 1, wherein the processing unit is configured to correct, based on the diagnostic signal, a magnitude of at least one of the diagnostic signal or the detection signal.

4. The inertial detection circuit of claim 1, wherein the signal generator is configured to correct, based on the diagnostic signal, an amplitude of at least one of the test voltage or the drive voltage.

5. An inertial sensor, comprising:
inertial detection circuit of claim 1; and
the detector.

6. The inertial sensor of claim 5, wherein the detector is configured to output, to the processing unit, a differential signal between an output signal of the moving electrode and an output signal of the fixed electrode.

7. The inertial sensor of claim 6, wherein the detector includes:
a first CV conversion circuit and a second CV conversion circuit, each of which includes an input terminal to be electrically connected to the fixed electrode or the moving electrode, and an output terminal outputting a voltage depending on the capacitance between the fixed electrode and the moving electrode;
a differential amplifier configured to output, to the processing unit, a differential voltage between a voltage output from the output terminal of the first CV conversion circuit and a voltage output from the output terminal of the second CV conversion circuit;
a capacitor including a first electrode electrically connected to the fixed electrode, and a second electrode disposed to face the first electrode; and
a switching unit configured to switch between:
a first state where the second electrode is caused to be electrically connected to the input terminal of the first CV conversion circuit, and the moving electrode is caused to be electrically connected to the input terminal of the second CV conversion circuit; and
a second state where the second electrode is caused to be electrically connected to the input terminal of the second CV conversion circuit, and the moving electrode is caused to be electrically connected to the input terminal of the first CV conversion circuit.

8. The inertial detection circuit of claim 1, wherein
the detection processor configured to perform the detection processing by multiplying an absolute value of the detection signal by a prescribed value; and
the detection signal is a voltage signal corresponding to the component of the inertial force applied to the moving electrode.

9. D) An inertial detection method, comprising:
a signal generating step including generating a signal to be output to a detector configured to convert an inertial force to an electrical signal; and
a processing step including processing the electrical signal output from the detector, wherein
the detector includes:
  a fixed electrode; and
  a moving electrode disposed to face the fixed electrode, the moving electrode being movable with respect to the fixed electrode in a facing direction in which the moving electrode and the fixed electrode face each other, the signal generating step including:
  a drive voltage generating step including applying to the fixed electrode a drive voltage with a first frequency to make the moving electrode vibrate; and
  a test voltage generating step including applying to the fixed electrode a test voltage with a second frequency lower than the first frequency to make the moving electrode vibrate,
the processing step includes:
  a detection processing including detecting a capacitance value between the fixed electrode and the moving electrode based on a detection signal, corresponding to a component of an inertial force applied to the moving electrode, of the electrical signal output from the moving electrode; and
  a diagnostic processing including diagnosing abnormality of the detector based on a diagnostic signal, corresponding to a component of the second frequency, of the electrical signal output from the moving electrode, and
  the signal generating step includes correcting, based on the diagnostic signal, an offset of at least one of the test voltage or the drive voltage.

10. The inertial detection method of claim 9, wherein
the detection processing is performed by multiplying an absolute value of the detection signal by a prescribed value; and
the detection signal is a voltage signal corresponding to the component of the inertial force applied to the moving electrode.

* * * * *